United States Patent

Jedlicka et al.

[11] Patent Number: 5,533,557
[45] Date of Patent: Jul. 9, 1996

[54] JOINTER/PLANER MACHINE

[75] Inventors: Frederick B. Jedlicka, Jerseyville, Ill.; Frank J. Tomiser, Jr., St. Louis, Mo.

[73] Assignee: Emerson Electric Co., St. Louis, Mo.

[21] Appl. No.: 370,662

[22] Filed: Jan. 10, 1995

[51] Int. Cl.⁶ .................. B27C 1/14; B27C 1/12
[52] U.S. Cl. .............. 144/253.8; 144/129; 144/253.5
[58] Field of Search .................. 83/467.1, 468.7; 144/253 R, 253 G, 253 H, 129

[56] References Cited

U.S. PATENT DOCUMENTS

| | | | |
|---|---|---|---|
| 2,592,384 | 4/1952 | Boice | 144/253 G |
| 2,872,957 | 2/1959 | Eschenburg | 144/253 G |
| 3,894,340 | 7/1975 | Ellis, Jr. | 33/185 |
| 4,356,851 | 11/1982 | Glore | 144/253 |
| 4,372,358 | 2/1983 | Glore | 144/117 |
| 4,427,042 | 1/1984 | Mitchell et al. | 144/1 R |
| 4,694,582 | 9/1987 | Walston, Jr. | 33/635 |
| 4,830,076 | 5/1989 | Feyer | 144/287 |
| 4,915,148 | 4/1990 | Fox | 144/1 |
| 4,961,287 | 10/1990 | Compton | 51/74 |
| 4,987,704 | 1/1991 | Johnson et al. | 51/246 |
| 5,022,447 | 6/1991 | Monobe | 144/253 G |

FOREIGN PATENT DOCUMENTS

| | | | |
|---|---|---|---|
| 1270685 | 7/1961 | France | 144/253 G |
| 519187 | 3/1940 | United Kingdom | 144/253 G |

Primary Examiner—W. Donald Bray
Attorney, Agent, or Firm—Polster, Lieder, Woodruff & Lucchesi

[57] ABSTRACT

An adjustable worktable fence for a jointer/planer machine is disclosed. The jointer/planer machine includes an elongated worktable having a rotary cutter mounted in alignment with and positioned below a transverse slot in the elongated table. An adjustable worktable fence extends generally longitudinally along the elongated worktable in generally transverse relationship to the rotating cutter. The adjustable worktable fence is mounted to an adjustable fence bracket that includes adjustable knobs for independent slidable movement of the adjustable worktable fence in generally transverse relationship to the rotating cutter as well as independent pivotal movement for bevel adjustment of the adjustable worktable fence relative to the rotating cutter. The jointer/planer machine also includes a table elevating mechanism for accurate elevational adjustment of the worktable relative to a supporting base. A chip collection system for the jointer/planer machine is further provided to facilitate vacuum disposal of wood chips.

16 Claims, 9 Drawing Sheets

JOINTER/PLANER MACHINE

BACKGROUND OF THE INVENTION

The present invention relates to an improved jointer/planer machine, and more particularly, to a new and improved adjustable worktable fence, table elevating mechanism and chip collection system for the jointer/planer machine.

A jointer/planer machine has replaced the hand plane for many edge and surface wood preparation jobs. In addition, the jointer/planer machine has broader use in this since it can also cut tapered legs, chamfers, and tenons. As a result, jointer/planer machines have become an important tool for the home-workshop market.

The jointer/planer functions like a motorized up-side-down hand plane. In place of the hand plane's base, jointer/planers have a machine bed that includes a workpiece infeed table and a workpiece outfeed table. Between the two tables, a rapidly rotating cutter head containing two or three knives is provided. A longitudinally extending fence extends along the bed or worktable of the jointer/planer in transverse relationship to the rotating cutter. The fence is designed to move across the width of the rotating cutter in a transverse sliding movement, as well as being tilted for bevel cuts. As a workpiece is passed across the worktable or bed of the jointer/planer, a cutter head guard is pivotally swung out of the way in order to expose the rotating cutter for removing the desired amount of material. During the cutting operation, woodstock is firmly held against the adjustable fence for a squared or beveled cut, depending upon the slidable or pivotal adjustment of the fence relative to the worktable or bed.

It has been discovered that current jointer/planer machines have problems associated with the adjustable fence mechanism, the table elevational mechanism and the chip collection system. With respect to the adjustable fence mechanism, current prior art fences are difficult to assemble, align as well as adjust fixed bevel stops, i.e., at 45° and 90°. Even when the adjustable fence assembly is aligned and adjusted properly, it is difficult to repeatably set the fence bevel angle with any preciseness. Furthermore, when sliding the adjustable fence across the table relative to the rotating cutter, the adjustable fence angle must be re-aligned. With respect to the table elevating mechanism, the current elevation system has too many parts and too much play in its operation, especially when the depth of the cut is reversed. Due to the amount of movement within the elevation system in prior art jointer/planer machines, the operator/user cannot associate the amount of cutting depth with respect to the amount of knob rotation. Thus, precise adjustment of the table elevational mechanism has not been possible. For the chip collection system, it is known that a gravity fill type bag collection system or a vacuum system could be employed; however, there is no practical and efficient way of changing over the chip collection system to either a gravity fill type or a vacuum system, as may be desired.

As will be seen from the discussion that follows with respect to the new and improved features in the adjustable fence mechanism, table elevational mechanism and chip collection system of the present invention, the aforementioned problems of the prior art have been overcome with new and improved unique and structurally interrelated features with respect to each of such aforementioned mechanisms, in order to provide a better working and operating jointer/planer machine than has been heretofore available.

SUMMARY OF THE INVENTION

Among the several objects and advantages of the present invention include a new and improved adjustable fence mechanism for a jointer/planer machine which provides improved fence control and stability for ease of operation, improved accuracy, and repeatability;

The provision of the aforementioned improved adjustable fence mechanism which includes separate knobs for slidable and bevel adjustment in order to control precise movement of the fence;

The provision of the aforementioned improved adjustable fence mechanism which provides easy and straightforward bevel stops for fence adjustment, as well as rigid bevel stops for improved accuracy and repeatability;

The provision of the aforementioned adjustable fence, mechanism which includes a wide center mount pivot system, single fence movement controlled by individual operating knobs and rigid pivoting and sliding control systems;

The provision of the aforementioned adjustable fence mechanism which is more rigid due to a wide center mount pivot system while also eliminating fence height adjustment due to a low profile fence pivot system when making bevel adjustments;

The provision of a new and improved table elevating mechanism for the jointer/planer which reduces the amount of parts necessary in order to control the elevation mechanism as well as provide improved control in the depth of cut associated with elevational control knob adjustments;

The provision of a new and improved chip collection system for the jointer/planer machine which has greater accessibility and functionality by providing a snap-in nozzle for a chip vacuum system which can be easily removed or inserted as desired, depending on the use of the chips collection system as a vacuum system or as a gravity fed chip collection system; and The provision of the aforementioned features in a jointer/planer machine which are easy to manufacture, assemble and use; are rugged, durable and long-lasting; provide accurate, precise and controlled movement; and are otherwise well adapted for the purposes intended.

Briefly stated, the present invention provides improved features in an adjustable worktable fence or mechanism, a table elevation mechanism and a chip collection system.

For the adjustable worktable fence in the jointer/planer machine, an elongated worktable includes a rotating cutter mounted in alignment with and positioned below a transverse slot in the elongated table. An adjustable worktable fence extends generally longitudinally along the elongated worktable in generally transverse relationship to the rotating cutter that operates below the transverse slot in the elongated worktable; fence adjustment means are mounted to the adjustable worktable fence and the elongated worktable for slidable adjusting movement of the adjustable worktable fence in generally transverse relationship to the rotating cutter as well as independent pivotal movement relative to the elongated table for bevel adjustment of the adjustable worktable fence relative to the rotating cutter.

The slidable adjusting movement and the pivotal adjusting movement of the adjustable worktable fence are precisely and incrementally controlled.

The fence adjusting means includes an adjustable fence bracket which provides the independent slidable and pivotal adjustment of the adjustable worktable fence. The adjustable fence bracket is preferably mounted in a central area of the adjustable worktable fence to provide a more rigid wide center mount pivot system.

The adjustable worktable fence is slidably adjustably mounted relative to the adjustable fence bracket while also being pivotally mounted to the adjustable fence bracket, preferably along the lowest area of the fence, for bevel adjustment of the adjustable worktable fence relative to the rotating cutter to provide a minimal gap between adjustable worktable fence and bed.

The adjustable fence bracket includes adjusting scales for precise slidable and pivotal adjustment of the adjustable worktable fence. Individual adjustment knobs are provided for controlling the precise slidable and pivotal adjustment of the adjustable worktable fence.

The adjustable fence bracket includes a first element for slidable adjustment of the adjustable worktable fence and a second element for pivotal adjustable movement of the adjustable worktable fence. In one embodiment, both of the first and second elements are laterally offset from one another. In one such embodiment, generally parallel adjusting slots are provided in both the first and second elements for receiving a separate adjusting knob. In another embodiment, both of the first and second elements include generally transversely extending slots, each of which receive an adjusting knob. In yet another embodiment, the first and second elements not only include transversely extending slots, but also require three adjusting knobs for the sliding and pivotal adjustment of the adjustable worktable fence.

For the improved table elevating mechanism in a jointer/planer machine, a worktable is mounted on a supporting base. Table elevating guides are provided including complementary male and female guides that are mounted to the supporting base and worktable. The complementary male and female guides have cooperating angularly inclined surfaces which are movable relative to one another to provide elevational adjustment of the worktable relative to the supporting base. A selectively adjustable worktable elevating mechanism includes a selectively adjustable elevating knob mounted to the worktable for moving the worktable relative to the supporting base along the cooperative angularly inclined surfaces of the complementary male and female guides for raising and lowering the worktable relative to the supporting base. The selectively adjustable elevating knob that is mounted to the worktable is at generally the same angular incline as the cooperative angularly inclined surfaces of the complementary male and female guides for accurate elevational adjustment of the worktable relative to the supporting base.

The selectively adjustable elevating knob may include a worktable elevation plate attached to one end of the worktable which is slidably mounted on the supporting base. The selectively adjustable elevating knob is mounted to the worktable elevation plate. A spring washer is mounted between the worktable elevation plate mad the selectively adjustable elevating knob to restrict end play movement between the worktable elevational plate and the selectively adjustable elevating knob.

For the vacuum chip collection system of a jointer/planer machine, a gravity fed chip collector is mounted in surrounding relationship to the rotating cutter within the worktable. A detachable vacuum nozzle is connected to a lower end of the chip collector. The detachable vacuum nozzle is capable of being connected to a vacuum cleaner by a vacuum hose mounted to detachable vacuum nozzle. Alternatively, the detachable vacuum nozzle can be disconnected from the gravity fed chip collector when vacuum disposal of chips is not desired.

Other and further objects of the present invention will become apparent from the discussion that follows.

Corresponding references numerals will be used throughout the several figures of the drawings.

DESCRIPTION OF THE PREFERRED EMBODIMENTS

The following detailed description illustrates the invention by way of example and not by way of limitation. This description will clearly enable one skilled in the art to make and use the invention, and describes several embodiments, adaptions, variations, alternatives and uses of the present invention, including what we presently believe are the best modes of carrying out the invention.

Figure 8:
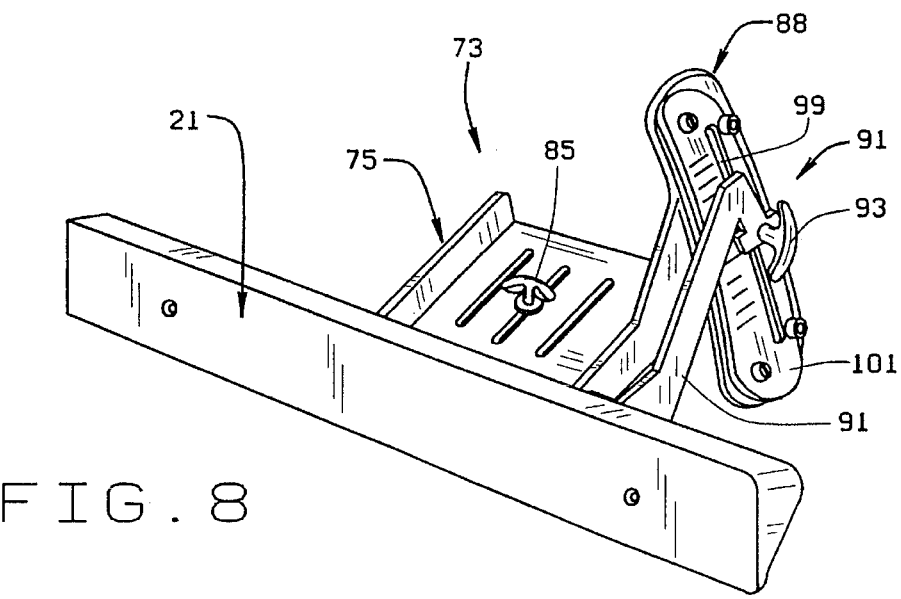
FIG. 8 is a perspective view of a modified form of adjustable fence mechanism coming within the purview of the present invention.
Figure 9:
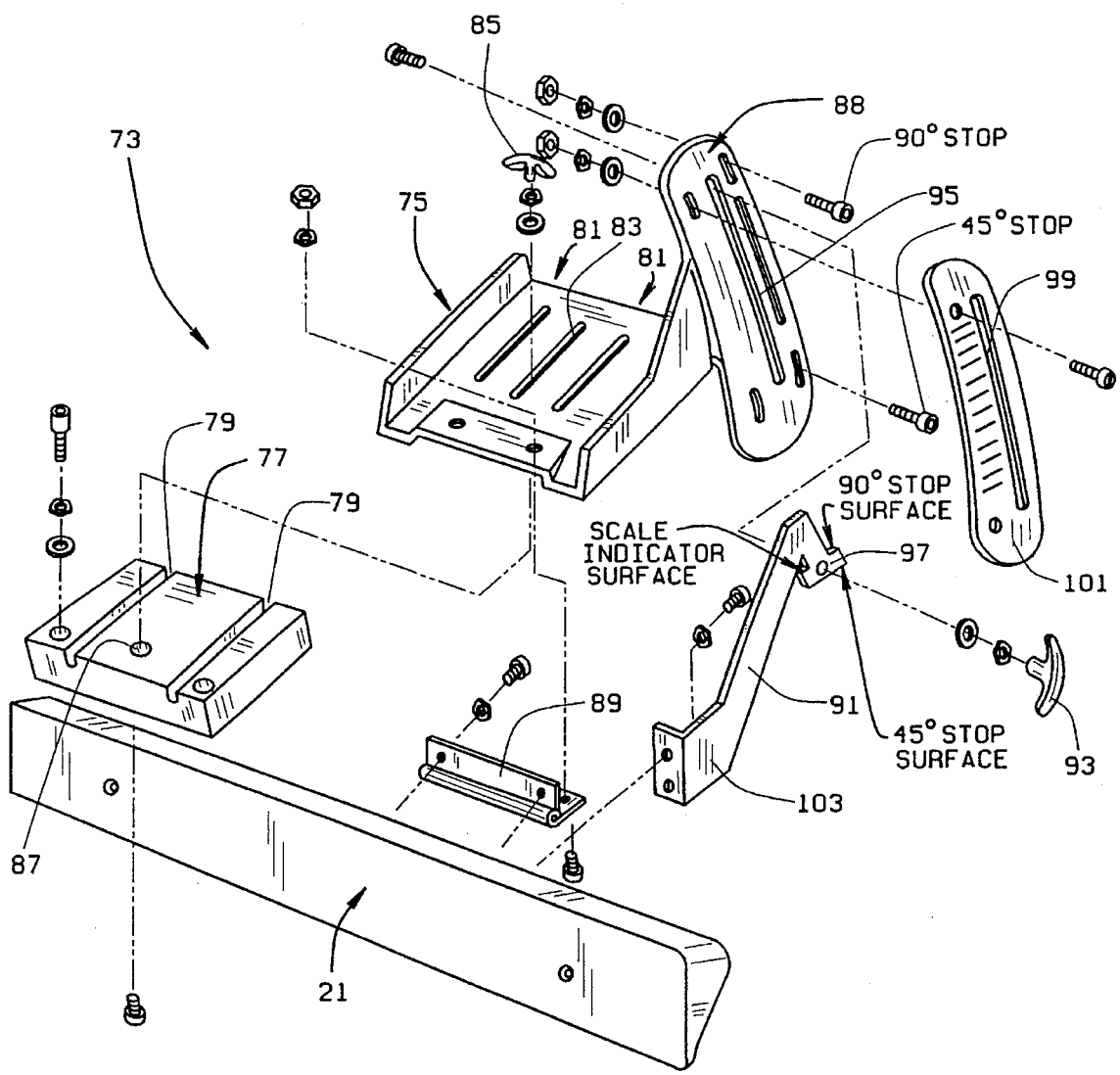
FIG. 9 is an exploded perspective view of the adjustable fence mechanism illustrated in the modified embodiment of FIG. 8.
Figure 10:
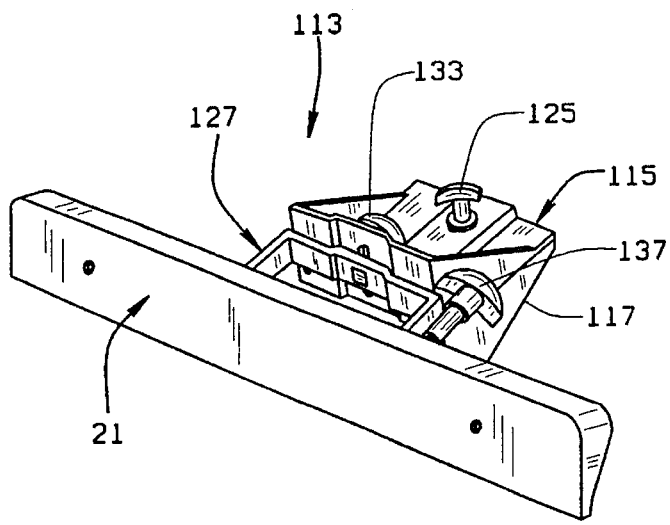
FIG. 10 is a perspective view of still another modified form of adjustable fence mechanism constructed in accordance with the teachings of the present invention.
Figure 12:
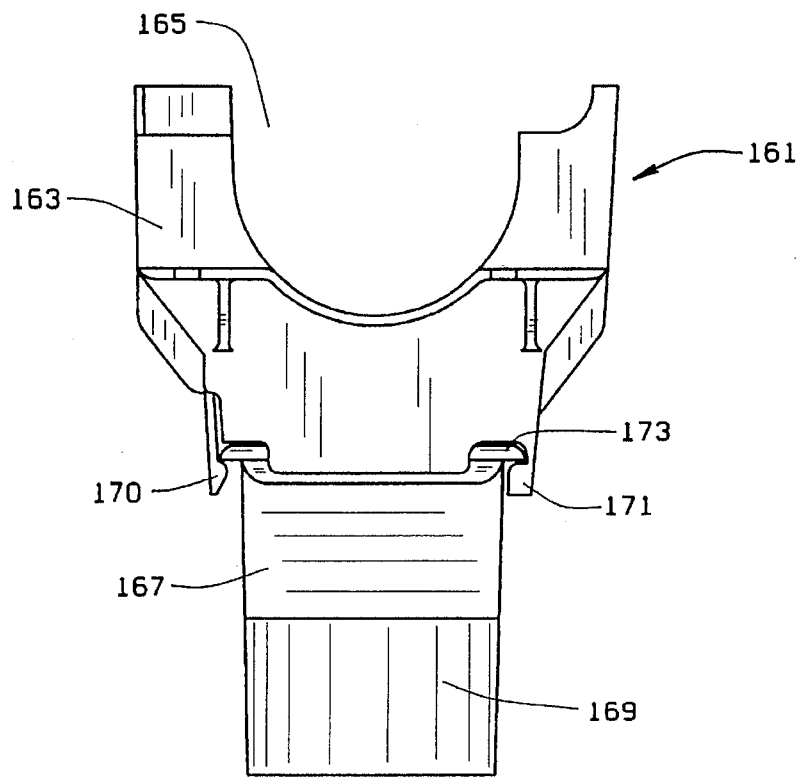
FIG. 12 is an enlarged elevational view of the components comprising the improved chip collection system of the present invention.
Figure 13:
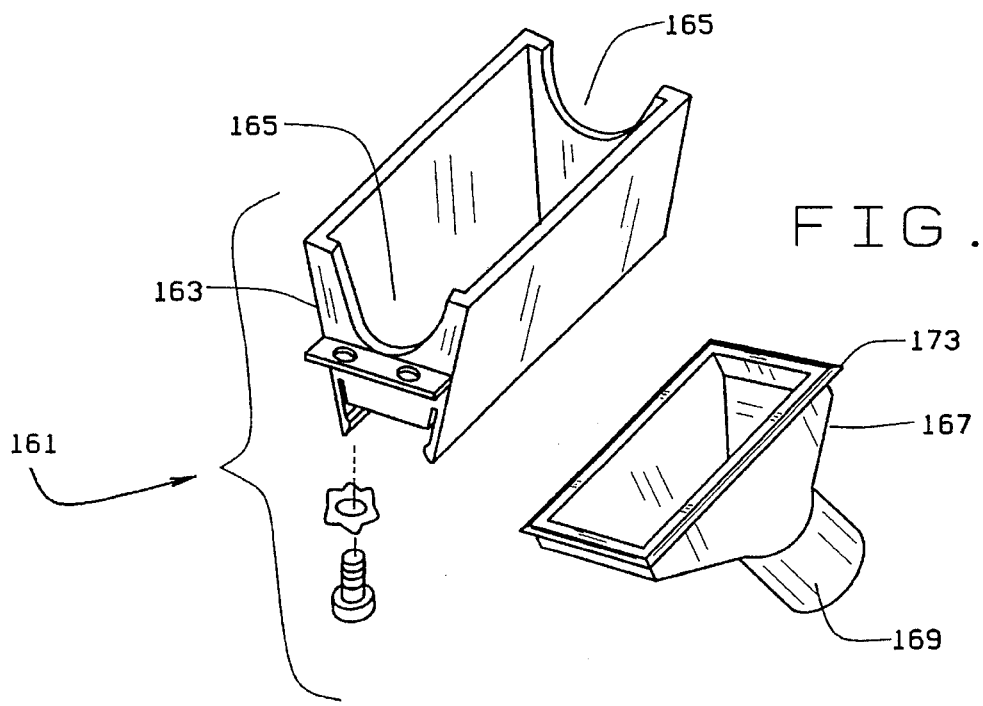
FIG. 13 is a reduced in size exploded perspective view of the chip collection system components.

As indicated above, the present invention discloses a new and improved adjustable worktable fence; a new and improved table elevating mechanism and a new and improved chip collection system. FIGS. 1–7 disclose one embodiment of each of such aforementioned new and improved mechanisms, with FIGS. 8–9 and 9–10 showing other embodiments of the adjustable worktable fence, while FIGS. 12–13 illustrate in greater detail the chip collection system.

Figure 1:
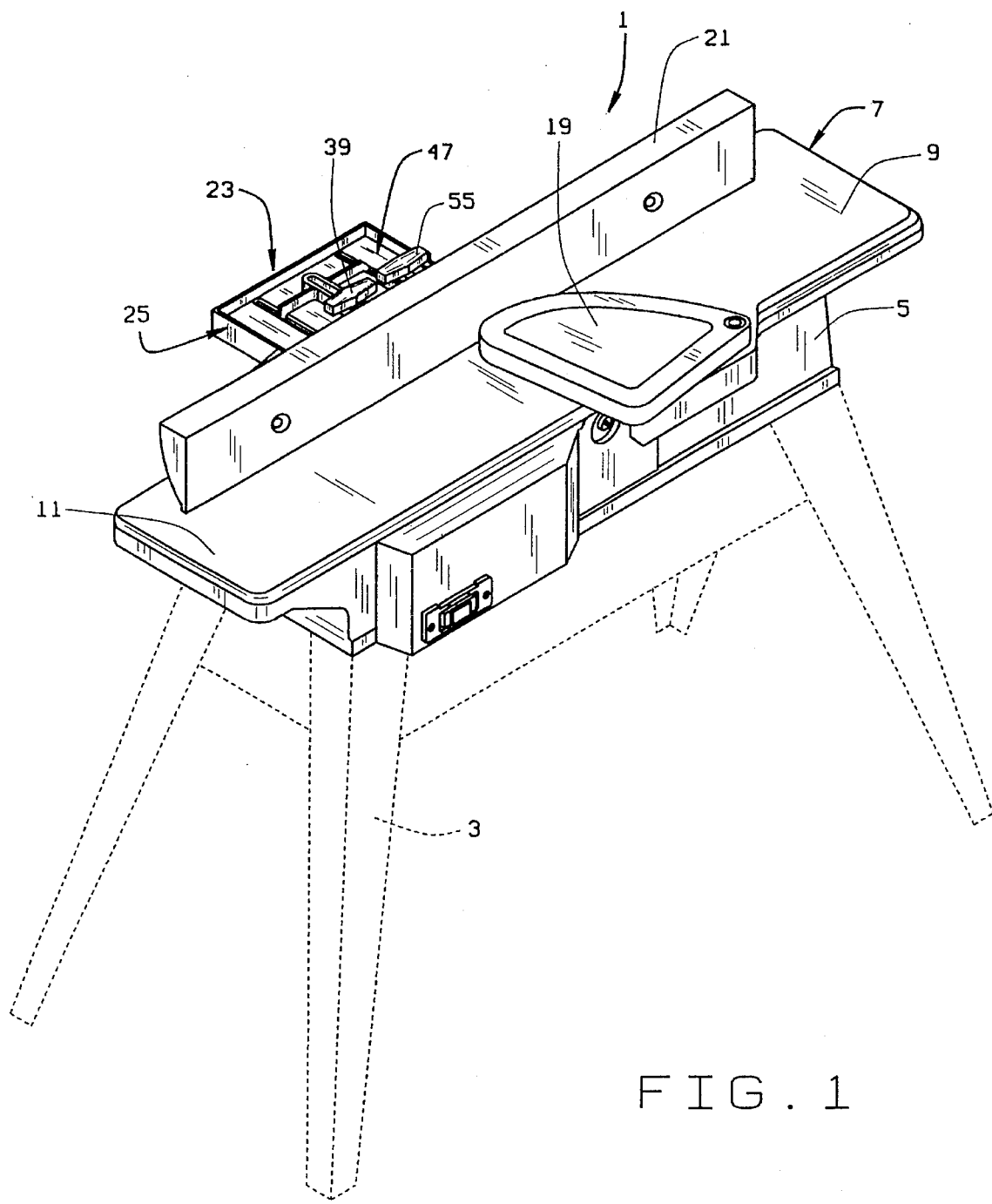
FIG. 1 is a top perspective view of the jointer/planer machine which incorporates the features of the present invention, the jointer/planer machine being mounted on a stand or base shown in phantom lines.
Figure 2:
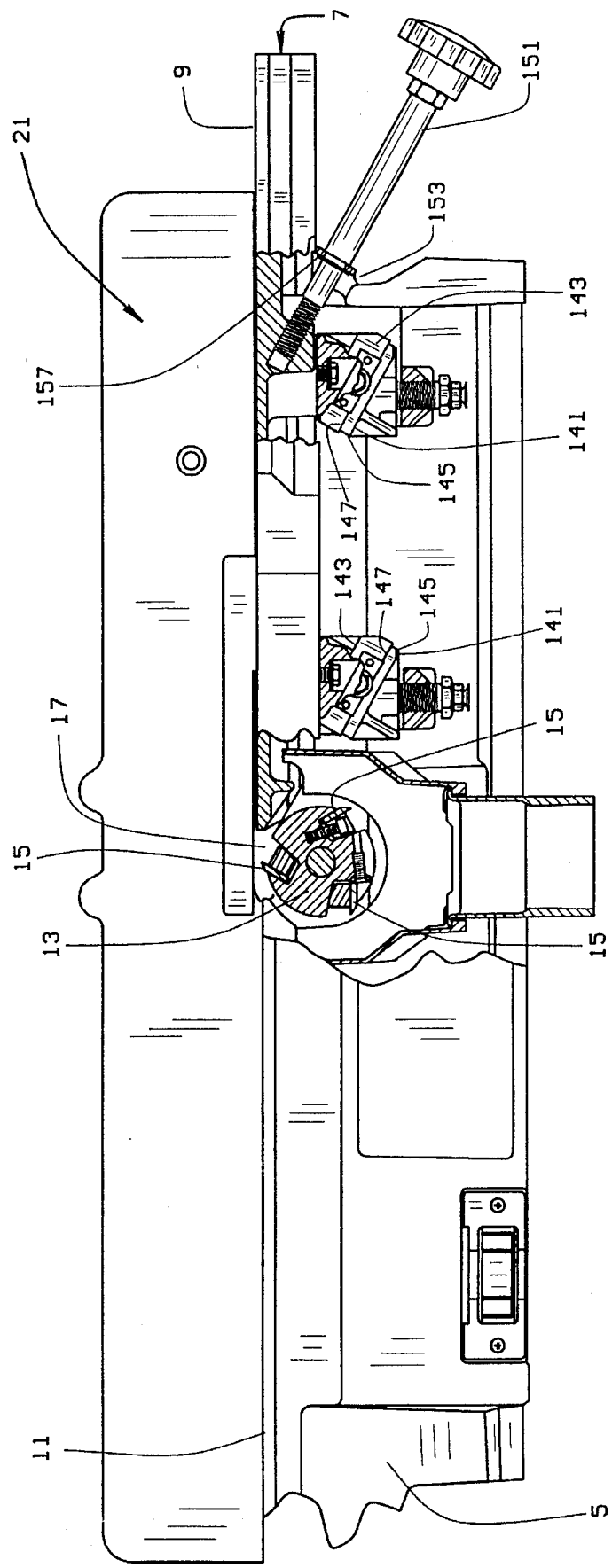
FIG. 2 is a front elevational view, partly in section, of the jointer/planer machine incorporating the improved features of the present invention.
Figure 3:
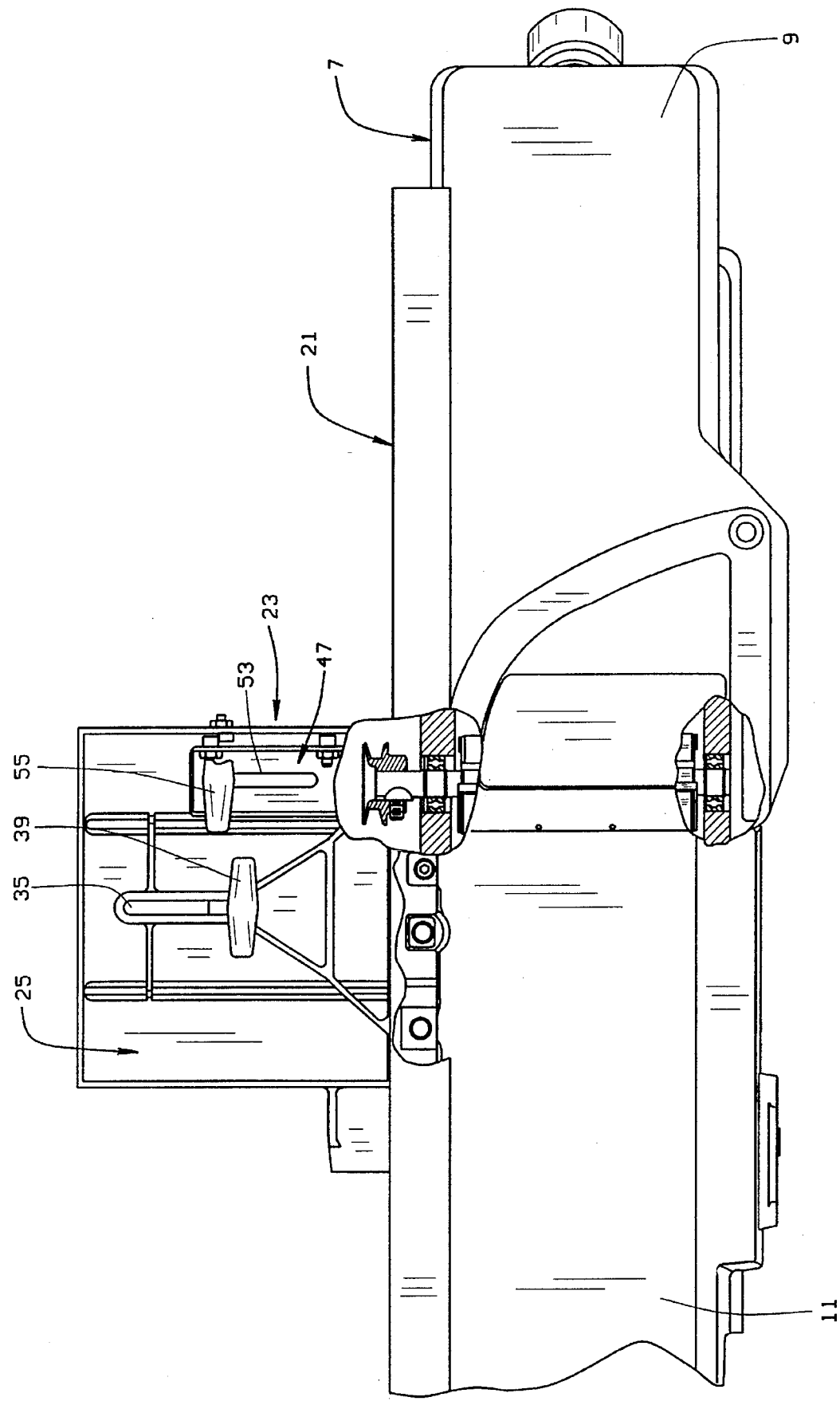
FIG. 3 is a fragmentary top plan view of the jointer/planer machine with improved features of the present invention.
Figure 4:
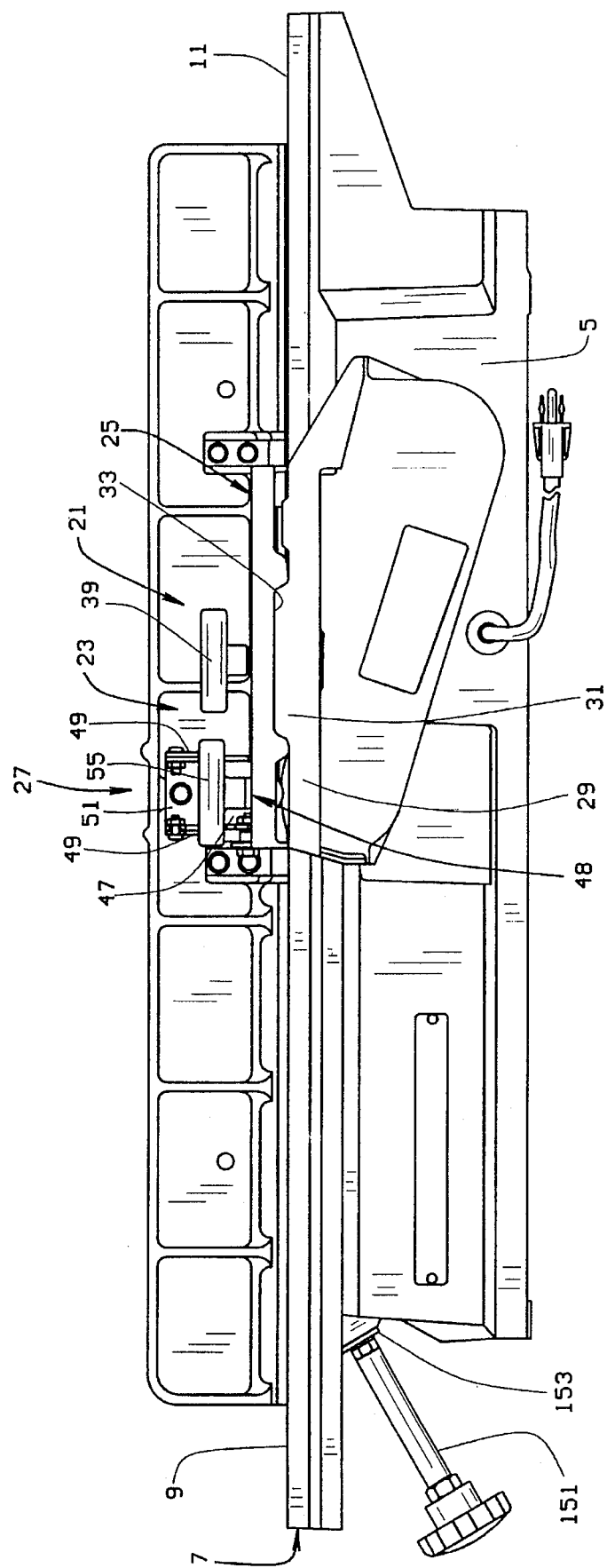
FIG. 4 is a rear elevational view of the jointer/planer machine of the present invention.

In order to understand the new and improved mechanisms of the present invention, reference is first made to FIGS. 1–6 of the drawings for a general description of a jointer/planer machine. As illustrated in FIG. 1 of the drawings, the jointer/planer machine 1 of the present invention is adapted to be mounted on a stand 3 which is shown in phantom lines to indicate that any one of a number of stands may be utilized with the jointer/planer machine 1 of the present invention. The jointer/planer machine 1 includes a base 5 which rests on the stand 3. An elongated worktable 7 rests atop the base 5 and includes an infeed table 9 and an outfeed table 11. As best seen in FIG. 2 of the drawings, between the infeed and outfeed tables 9, 11, respectively, a rotating cutter 13 is positioned. The rotating cutter is illustrated as having three knives 15 for removing predetermined amounts of material from the lower side and edge faces of a wood workpiece. The knives 15 of the rotating cutter 13 are adjustably mounted to accommodate wear and for proper operation of the rotating cutter 13.

To pass a wood workpiece over the rotating cutter 13, the infeed table 9 is normally set a predetermined distance below the blade tip of knives 15 of the rotating cutter 13. For example, the infeed table may be set from 1/32" to 1/8" below the blade tip of knives 15 of the rotating cutter 13. The outfeed table 11 preferably sits flush with the top of the rotating cutter 13. As the wood workpiece passes across the elongated worktable or bed 7, the cutter head guard 19, normally spring urged to the position illustrated in FIG. 1, is moved by the wood workpiece to expose the rotating cutter 13 for the desired cutting operation.

During the cutting operation, the wood stock or workpiece is held firmly against the adjustable worktable fence 21 which is adjustable both across the width of the rotating cutter 13, as well as being tilted for bevel cuts. The adjustable worktable fence 21 is shown in FIGS. 1–7 as extending longitudinally along the elongated worktable 7 in generally transverse relationship to the rotating cutter 13 that operates below the transverse slot 17 formed between the infeed and outfeed tables 9, 11 respectively.

With the general description of operation of a jointer/planer machine, reference is now made to the feature/mechanisms of the present invention which have been employed to provide reliable, controlled and better operating mechanisms than those of the prior art.

With respect to the adjustable worktable fence 21, prior art designs have been difficult to assemble and align as well as adjust predetermined bevel stops. Even where the adjustable worktable fence was properly aligned and adjusted, it was difficult to obtain repeatable settings of a fence bevel angle. Also, when sliding the adjustable worktable fence across the elongated worktable in the prior art designs, the fence angle must be re-aligned. As will be explained in detail below, the adjustable worktable fence 21 of the present invention illustrated as one embodiment in FIGS. 1–7 of the drawings and additional embodiments illustrated in FIGS. 8–9 and in the detailed illustration of FIGS. 10–11, overcomes the aforementioned difficulties of the prior art.

Figure 5:
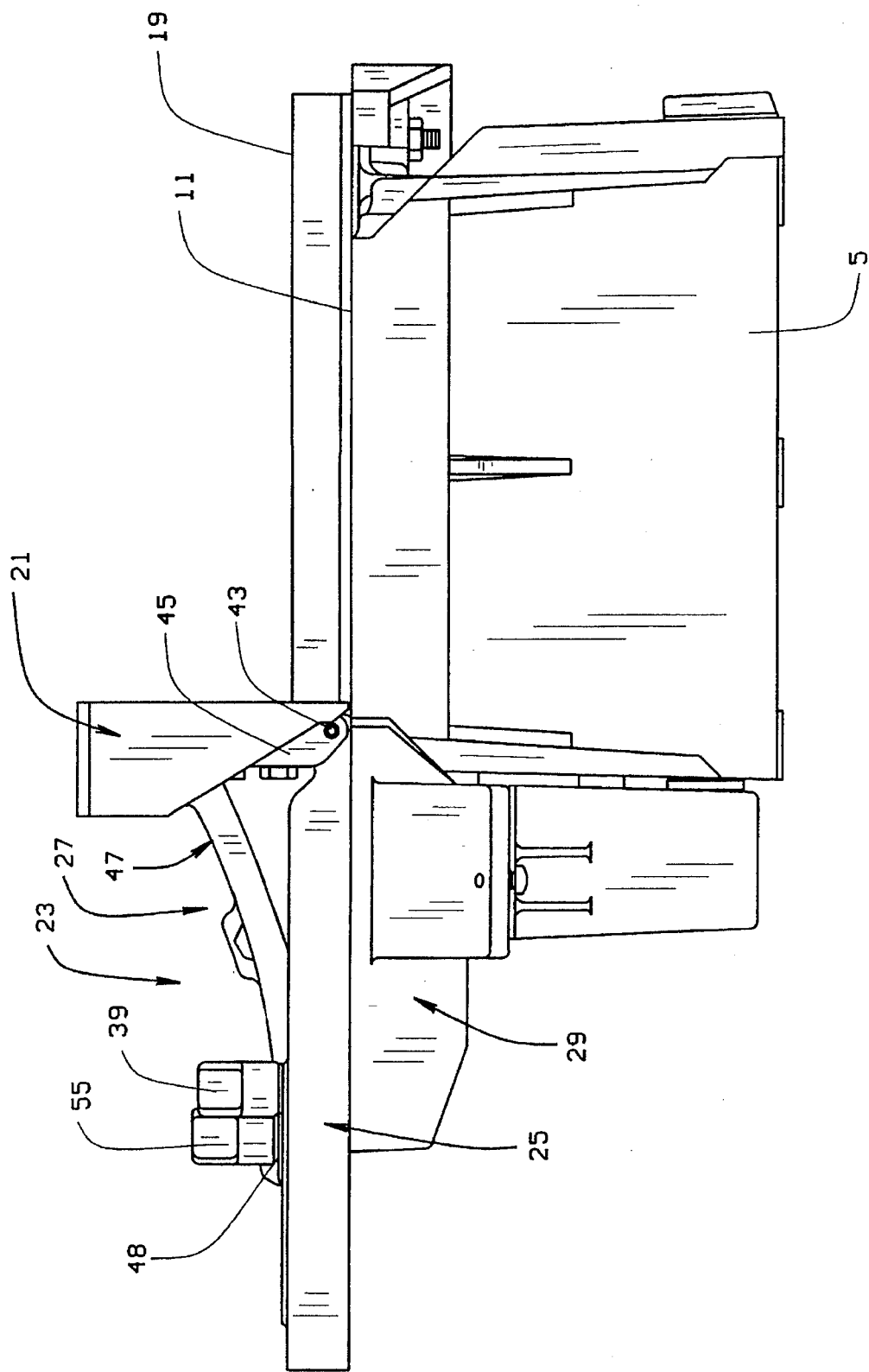
FIG. 5 is a left side elevational view of the jointer/planer machine of the present invention.
Figure 6:
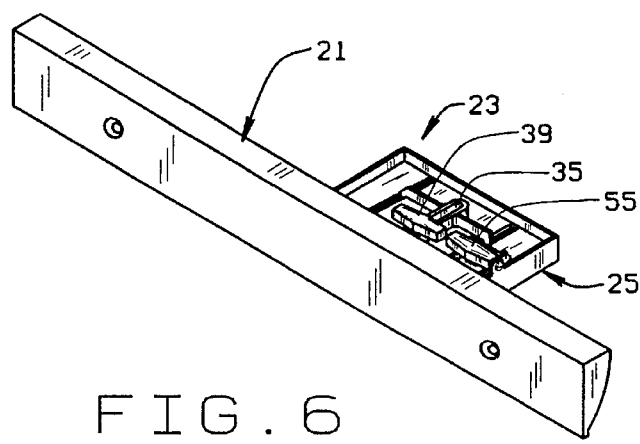
FIG. 6 is a perspective view of the improved adjustable fence mechanism incorporated in the jointer/planer machine of the present invention.
Figure 7:
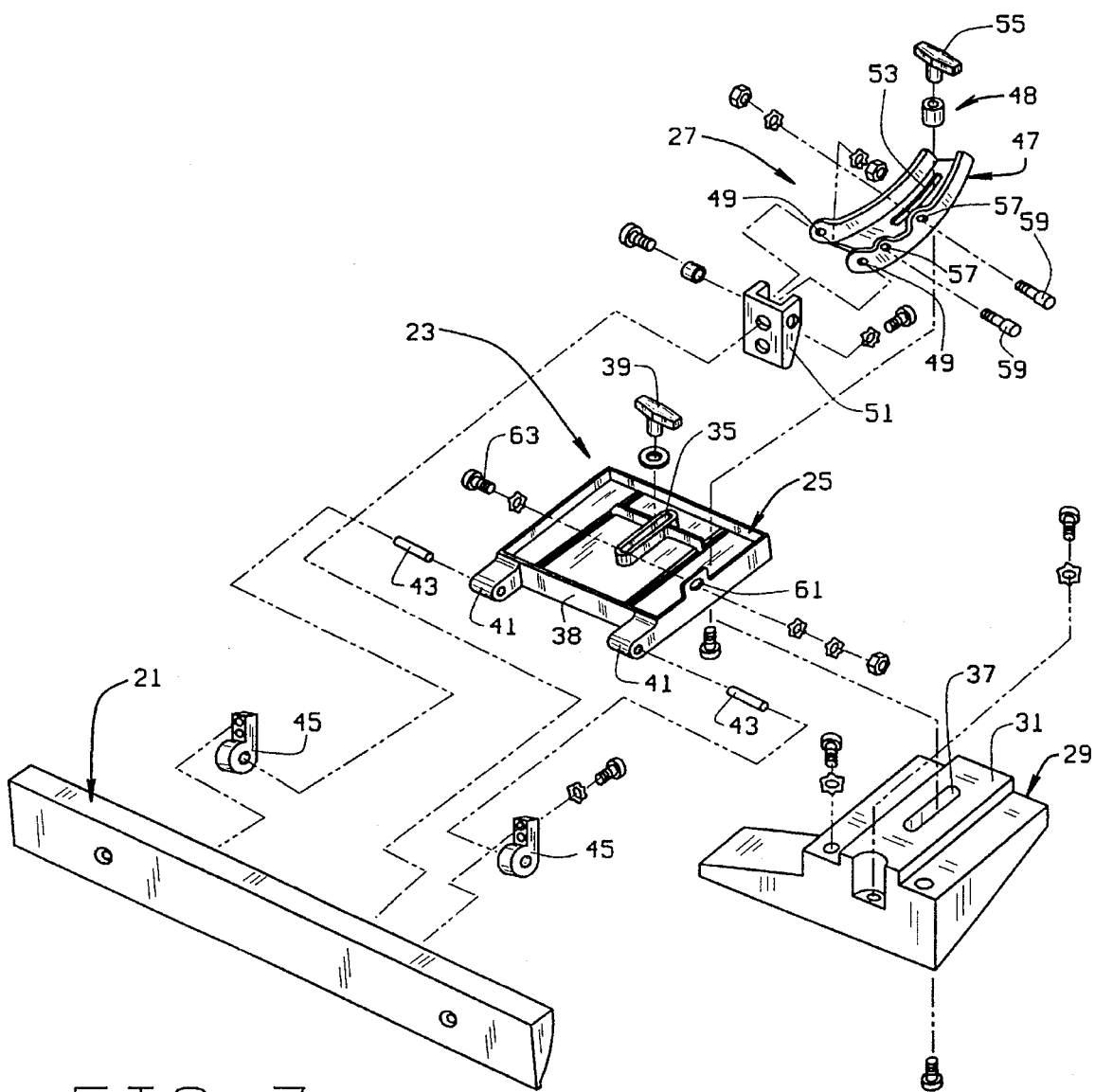
FIG. 7 is an exploded perspective view of the improved adjustable fence mechanism shown in FIG. 6.

With specific reference to the first illustrated embodiment of the new and improved adjustable worktable fence 21 shown in FIGS. 1–7 of the drawings, it will be seen from the perspective and exploded perspective views of FIGS. 6–7, respectively, that the adjustable elongated worktable fence 21 includes an adjustable fence bracket 23 that provides the slidable adjusting movement generally transverse to the rotating cutter 13 as well as the independent pivotal movement of the adjustable worktable fence relative to the elongated worktable 7 and the rotating cutter 13. The adjustable fence bracket 23 is made up of several components and includes a sliding fence bracket 25 and a pivot fence bracket assembly 27. The sliding fence bracket 25 is preferably a cast metal product configured as illustrated which is adapted to be mounted relative to the casting table extension 29, the latter being mounted to the base 5 for supporting the adjustable fence bracket 23. The table extension 29 includes on its upper face an elongated rectangular shaped boss or riser 31 for mating engagement with a complementary configured surface 33 formed in the lower face of the sliding fence bracket 25. Thus, the sliding fence bracket 25 is moved in a precisely controlled movement relative to the adjustable worktable fence 21 through the complementary interengagement of the complementary mating surface 33 with the upwardly extending boss or riser 31 of the table extension 29. Aligned slots 35, 37 are provided in the sliding fence bracket 25 and the table extension 29, respectively, for reception of adjusting knob components 39, in order to provide threadable adjusting and locking movement of the sliding fence bracket 25 relative to the table extension 29, as will be apparent. Two alignment slots 35, 37 are used to minimize the size of the sliding fence bracket 25 and table extension 29, along with reducing assembled depth of tool, yet maximizing fence stability by keeping knob 39 at the nearest edge of the slot to the fence 21.

The sliding fence bracket 25, at its forward end 38 includes a pair of spaced pivot supports 41, 41 for receiving the roll pins 43, 43 in pivotally mounting the sliding fence bracket 25 to the adjustable worktable fence 21 through the pivot fence mounts 45, 45 that are secured to the rear of the adjustable worktable fence 21 in preferably the lowest area. The actual tilting or bevel positioning of the adjustable worktable fence 21 relative to the supporting base 5, surface 11, elongated worktable 7, and surface 9 is best illustrated in FIG. 5 of the drawings.

In order to provide the tilting or bevel adjustment of the adjustable worktable fence 21 relative to the elongated worktable 7, surface 9, and the rotating cutter 13, the fence pivot bracket assembly 27 is provided. The fence pivot bracket assembly 27 includes a fence pivot support 47 which has a slightly curved or curvilinear shape, as illustrated in FIGS. 5 and 7 of the drawings. The fence pivot bracket 47 further includes an elongated slot 53 for receiving the components of the adjustable knob 55 for slidably adjustably mounting the fence pivot bracket 47 to the sliding fence bracket 25. Note that fence pivot bracket 47 is curved in shape and is designed such that the area directly below knob 55 and spherical shaped spacer 48 is ideally in contact with sliding fence bracket 25 to minimize loosening of knob 55 and eliminate movement of adjustable worktable fence 21 as knob 55 is tightened. Thus, it will be appreciated that as the adjusting knob 55 is loosened to allow the fence pivot bracket 47 to move the adjustable worktable fence 21 in various desired bevel angles relative to the elongated table 7, surface 9, and the rotating cutter 13, until the desired bevel angle is selected.

As indicated above, the independent mounting of the fence pivot bracket 47 relative to the fence sliding bracket 25 and the adjustable worktable fence 21, through fence pivot mounting bracket 51, enables independent operation of the fence pivot bracket 47 and the sliding pivot bracket 23 relative to the adjustable worktable fence 21. Additionally, the fence pivot bracket 47 and the fence sliding bracket 25 are provided with cooperating fixed bevel stops. Specifically, holes 57, 57 are provided in spaced upstanding ears of the fence pivot bracket 47 for receipt of the spaced threaded stud fastener assemblies 59, 59. The sliding fence bracket 25 includes an opening 61 formed in an upstanding ear for receipt of the threaded stud assembly 63. The arrangement of the aforementioned components enables the threaded stud assembly 63 to be positioned between the spaced threaded stud assemblies 59, 59 of the fence pivot bracket 47. Thus, as the forwardmost threaded stud assembly 59 of the fence pivot bracket 47 engages the threaded stud assembly 63 of the fence sliding bracket 25, a pre-set 45° bevel angle for the adjustable worktable fence 21 may be established. The rearmost threaded stud assembly 59 may provide a 90° preset bevel stop when the same engages the threaded stud assembly 63 of the fence sliding bracket 25. As will be appreciated, this provides an easy and straightforward bevel stop and fence adjustment arrangement in the independent sliding and pivot adjustment system of the present invention.

The net result of the above features provides an easy and simple to control adjustable worktable fence 21 due to the separate knobs 39, 55 which control the sliding and bevel pivot movement of the adjustable worktable fence 21. It will also be apparent that there is improved accuracy and repeatability due to the manner in which the sliding fence bracket 25 moves with respect to the table extension 29, along with the center mount pivot system and the rigid pivoting and sliding control systems. It will also be appreciated that the low profile sliding fence bracket 25 provides a low profile fence pivot system for any desired bevel angle, thus eliminating fence height adjustment problems of the prior art. The fence pivoting system is also more rigid due to the wide center mount pivot system. Finally, it will be noted that the adjustable fence bracket 23, including particularly the sliding fence bracket 25, is constructed to cover the rotating cutter 13, in order to provide a safety feature, as well.

Reference is now made to the second alternative form of adjustable fence bracket 73 shown in FIGS. 8–9 of the drawings. Unlike the aluminum die cast sliding fence bracket 25 and fence pivot bracket assembly 27 in the adjustable fence bracket 23, the adjustable fence bracket 73 utilizes sheet metal formed bracket components. Specifically, the adjustable fence bracket 73 includes a fence lever 91 and a sliding fence bracket 75 which is slidably mounted with respect to the table extension 77. A track or grooves 79, 79 of the table extension 77 slidably and matingly receives the complementary formed runners or beads 81, 81 provided in the bottom wall of the sliding fence bracket 75. An elongated slot 83 receives the adjustment knob components 85 for mounting relative to the hole 87 formed in the table extension 77. A hinge 89 is mounted to both the adjustable worktable fence 21 and the sliding fence bracket 75, through the suitable fasteners illustrated, in order to provide both sliding and pivotal movement of the adjustable fence bracket 73. When the sliding fence bracket 75 is adjusted, the sliding fence bracket 75 is required to follow the pathway of the grooves 79, 79 of the table extension 77 in operating the adjustable worktable fence 21 through the hinge 89. In this slidable adjustment movement, the hinge 89 operates solely as a direct connection between the adjustable fence bracket 75 and the adjustable worktable fence 21.

In order to provide pivotal adjustment or beveling movement of the adjustable worktable fence 21, the sliding fence bracket 75 includes an integral, upstanding arm 88 that is offset relative to the sliding fence bracket 75. The integral upstanding arm 88 is connected to a fence lever 91 through the adjustment knob components 93 which extend through an elongated slot 95 in the upstanding arm 88. As illustrated, the adjustment knob components 93 extend through one apertured end 97 of the fence lever 91 and then through a slot 99 in the bevel fence scale 101, the fence bevel scale 101 being mounted to the upstanding arm 88, as illustrated in FIG. 8 through suitable fasteners, as shown. A second end 103 of the fence lever 91 is attached directly to the adjustable worktable fence 21, through the suitable fasteners shown. Thus, as the adjustable knob components 93 adjust the apertured end 97 of the fence lever 91 through the aligned slots 95, 99 of the upstanding arm 88 and fence bevel scale 101, respectively, the adjustable worktable fence 21 is rotated about the fence hinge 89 to provide the desired angular bevel adjustment of the adjustable worktable fence relative to the elongated table 7, surface 9, and the rotating cutter 13. The very accurate 90° and 45° bevel stop mechanism should be noted.

The FIGS. 8–9 alternative embodiment provide an easy adjustable mechanism to enable a user to set the desired bevel angle in an accurate, repeatable manner. This alternative embodiment is, of course, less rigid than the initial embodiment shown in FIGS. 1–7 of the drawings due to the use of the sheet metal components forming the sliding fence bracket 75 and bevel pivot adjustment components 89, 91 and 93. Also, the sliding fence brackets 75 in the FIGS. 8–9 embodiment do not provide the low profile design as the FIG. 1 embodiment, and thus, tall workpieces could interfere with the sliding fence bracket 75 at a 45° bevel angle. Otherwise, the FIGS. 8–9 embodiment has all of the ease, simplicity, repeatability and accuracy of the FIGS. 1–7 embodiment.

Figure 11:
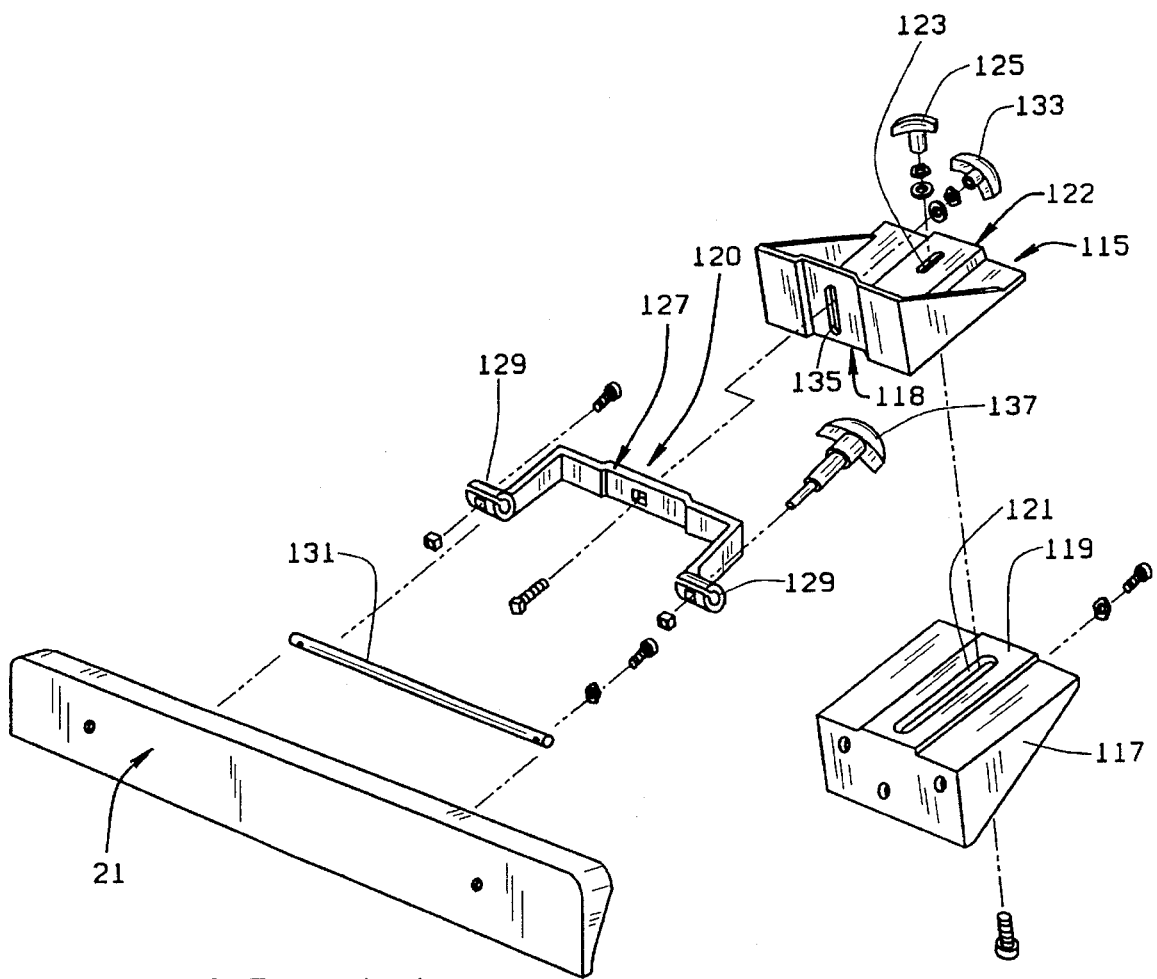
FIG. 11 is an exploded perspective view of the adjustable fence mechanism shown in the FIG. 10 embodiment.

Reference is now made to the third embodiment of adjustable worktable fence illustrated in FIGS. 10–11 of the drawings. The adjustable fence bracket 113 includes a sliding fence bracket 115, preferably made as an aluminum die cast product, which is slidably mounted on the extension table 117. Specifically, the table extension 117 includes a riser 119 having an elongated slot 121 therein for slidable complementary mating with a channel 122 of the sliding fence bracket 115 having a elongated slot 123 formed therein for register with the slot 121 of the table extension 117. An adjustable knob 125 extends through the complementary aligned slots 121, 123 for slidable adjusting movement of the sliding fence bracket 115 relative to the table extension 117. This permits the sliding fence bracket 115 to slidably move the adjustable worktable fence 21 in generally transverse relationship to the elongated worktable 7, surface 9, and the rotating cutter 13, as in the previous embodiments.

The sliding fence bracket 115 is mounted, as shown in FIGS. 10, to an aluminum U-shaped bracket 127 which is, in turn, mounted to the adjustable worktable fence 21. Specifically, the U-shaped bracket 127 includes a riser 120 for slidable, complementary mating with channel 118 of the sliding fence bracket 115 for fence height adjustment. The U-shaped bracket 127 includes pivot or journal ends 129, 129 for receiving the rod 131 that is mounted to the adjustable worktable fence 21.

A pair of adjusting knobs are required for setting the adjustable worktable fence 21 to different bevel angles. The first knob 133 extends through a vertical elongated slot 135 in the sliding fence bracket 115 for generally vertical fence height adjustment of the U-shaped bracket 127. A second adjustable knob 137 is mounted to one of the pivot or journal ends 129 for rotary fence bevel adjustment of the adjustable worktable fence 121 relative to the U-shaped bracket 127. Thus, the two adjustable knobs 133 and 137 provide the desired height and bevel angle adjustment, respectively, of the adjustable worktable fence 21 relative to the elongated table 7, surface 9, and the rotating cutter 13.

The FIGS. 10–11 embodiment requires more parts and precise features as compared with the above two discussed adjustable worktable fence embodiments. In addition, it requires more set up, adjustment and alignment time. This is due, in part, to the requirement of two knobs to set the different adjustable worktable fence 21 settings. However, the FIGS. 10–11 embodiment provides greater fence control and stability with the independent sliding and bevel adjustment, as in the two previously discussed embodiments.

Reference is now made to the table elevation mechanism, as best seen in FIG. 2 of the drawings. The supporting base 5 includes a pair of angularly offset spaced guides 141, 141 for complementary mounting and interengagement relative to the spaced guides 143, 143 extending from the lower face of the infeed table 9. The spaced guides 141, 141 and 143, 143 provide complementary male and female guides that are provided with cooperating angularly inclined surfaces 145, 147 relative to one another to provide elevational adjustment of the elongated table 7, surface 9, relative to the supporting base 5, surface 11. The complementary male and female guides 141, 141 and 143, 143 are each provided with the angularly inclined cooperating surfaces 145, 147 as is well known in the art.

What is not known is a selectively adjustable worktable elevating mechanism which includes a selectively adjustable elevating knob 151 that is mounted to elongated table 7 for adjustment generally along the same angular incline as the cooperating angularly inclined surfaces 145, 147 of each pair of cooperating male and female guides 141, 143. In this regard, it is to be noted that the selectively adjustable elevating knob 151 is threadably mounted to the elongated table 7 at generally the same angular incline as the cooperating angularly inclined surfaces 145, 147 of the complementary male and female guides 141, 143 for accurate elevational adjustment of the elongated table 7, surface 9, relative to the supporting base 5, surface 11. The selectively adjustable elevating knob 151 includes a worktable elevation bracket 153 that is mounted on the supporting base 5. A spring washer 157 is mounted between the worktable elevation plate 153 and the selectively adjustable elevating knob 151 to restrict end play movement between the worktable elevational plate 153 and the selectively adjustable elevating knob. Thus, the table elevating mechanism of the present invention provides an accurate elevational adjustment of the elongated table 7, surface 9, relative to the supporting base 5, surface 11 while minimizing any end play between such components during adjustment.

The vacuum chip collection system of the present invention is illustrated in FIGS. 12–13 of the drawings. Specifically, the vacuum chip collection system 161 for the jointer/planer machine includes a gravity fed chip collector having an opening 165 for mounting the gravity fed chip collector 163 in surrounding relationship to the rotating cutter 13, as will be understood. A detachable vacuum nozzle 167 is connected to a lower end of the chip collector 163. The detachable vacuum nozzle 167 includes an integral hose connection 169 for connecting to a vacuum hose, if desired. Alternatively, the detachable vacuum nozzle 167 can be detached from the gravity fed chip collector 163 when vacuum disposal of chips is not desired.

A pair of depending fingers 170, 171 underlie a surrounding lip 173 of the detachable vacuum nozzle 167. At least the finger 170 is flexible in order to releasably mount the upper lip 173 of the vacuum nozzle 167 in detachably mounting relationship relative to the depending finger 171. Thus, the chip collection system can be used as either a gravity fed or a vacuum disposal chip collection system, as may be desired.

From the foregoing, it will now be appreciated that the jointer/planer machine discloses several different embodiments of an adjustable worktable fence, a table elevation mechanism and a chip collection system that discloses new and improved features not shown or suggested by the prior art and which provide practical, economical and efficient features to facilitate operation, use and maintenance of the jointer/planer machine.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

We claim:

1. An adjustable worktable fence for a jointer/planer machine, comprising:

an elongated worktable including a rotating cutter mounted in alignment with and positioned below a transverse slot in the elongated table;

an adjustable worktable fence extending generally longitudinally along the elongated worktable in generally transverse relationship to the rotating cutter operating below the transverse slot in the elongated worktable;

transverse fence adjusting means mounted to said adjustable worktable fence and to said elongated table for slidable adjustable movement of said adjustable worktable fence in generally transverse relationship to said rotating cutter, said transverse fence adjusting means being pivotally mounted to said adjustable worktable fence; and bevel fence adjusting means mounted to said transverse fence adjusting means while also being independently pivotally mounted to said adjustable worktable fence for independent bevel adjustment of said adjustable worktable fence relative to said rotating cutter.

2. The adjustable worktable fence as defined in claim 1 wherein the transverse fence adjusting means and bevel fence adjusting means include cooperating predetermined fixed stops for predetermined bevel settings of the adjustable worktable fence.

3. The adjustable worktable fence as defined in claim 1 wherein the fence adjusting means includes an adjustable fence bracket which provides the independent slidable and pivotal adjustment of said adjustable worktable fence.

4. The adjustable worktable fence as defined in claim 3 wherein the adjustable fence bracket is mounted to a central area of the adjustable worktable fence.

5. The adjustable worktable fence as defined in claim 4 wherein the adjustable worktable fence is slidably adjustably mounted relative to said adjustable fence bracket.

6. The adjustable worktable fence as defined in claim 5 wherein a lowermost area of the fence is pivotally mounted to the adjustable fence bracket for bevel adjustment of said adjustable worktable fence relative to said rotating cutter.

7. The adjustable worktable fence as defined in claim 6 wherein the adjustable fence bracket includes all adjusting scale for precise slidable and pivotal adjustment of the adjustable worktable fence.

8. The adjustable worktable fence as defined in claim 7 and including individual adjusting knobs for controlling the precise slidable and pivotal adjustment of the adjustable worktable fence.

9. The adjustable worktable fence as defined in claim 8 wherein the adjustable fence bracket includes a first element for slidable adjustment of said adjustable worktable fence and a second element for pivotal adjustable movement of said adjustable worktable fence.

10. The adjustable worktable fence as defined in claim 9 wherein both of said first and second elements are laterally offset from one another.

11. The adjustable worktable fence as defined in claim 10 wherein both of said first and second elements include generally parallel adjusting slots each of which receive a separate adjusting knob.

12. The adjustable worktable fence as defined in claim 10 wherein both of said first and second elements include generally transversely extending slots each of which receive an adjusting knob.

13. The adjustable worktable fence as defined in claim 9 wherein the first and second elements are mounted in succession behind the adjustable worktable fence.

14. The adjustable worktable fence as defined in claim 13 wherein the first and second elements include first and second adjusting knobs to facilitate pivotal adjustment of said adjustable worktable fence.

15. The adjustable worktable fence as defined in claim 14 wherein one of the first and second elements also includes a separate adjustment knob for slidable adjustment of said adjustable worktable fence.

16. An adjustable worktable fence for a jointer/planer machine, comprising:

an elongated worktable including a rotating cutter mounted in alignment with and positioned below a transverse slot in the elongated worktable;

an adjustable worktable fence slidably mounted on the elongated worktable and extending generally longitudinally along the elongated worktable in generally transverse relationship to the rotating cutter operating below the transverse slot in the elongated worktable;

transverse fence adjustment means for slidably moving the adjustable worktable fence relative to said rotating cutter, said transverse fence adjustment means being pivotally mounted to the adjustable worktable fence;

bevel fence adjustment means independent of the transverse fence adjustment means for positioning the adjustable worktable fence in various bevel positions relative to said worktable, said bevel fence adjusting means being independently pivotally mounted to the adjustable worktable fence for independent bevel adjustment of the adjustable worktable fence relative to the rotating cutter; and both said transverse fence adjustment means and said bevel fence adjustment means being mounted to an adjustable fence bracket mounted between the adjustable worktable fence and said elongated table.

* * * * *

UNITED STATES PATENT AND TRADEMARK OFFICE
CERTIFICATE OF CORRECTION

PATENT NO. : 5,533,557
DATED : July 9, 1996
INVENTOR(S) : Frederick B. Jedicka and Frank J. Tomiser, Jr.

It is certified that error appears in the above-indentified patent and that said Letters Patent is hereby corrected as shown below:

```
Column 10
Line 56
Delete "all" and
Insert "--an--"
```

Signed and Sealed this

Fifth Day of August, 1997

Attest:

BRUCE LEHMAN

Attesting Officer

Commissioner of Patents and Trademarks